United States Patent
Child et al.

[11] Patent Number: 5,295,350
[45] Date of Patent: Mar. 22, 1994

[54] COMBINED POWER CYCLE WITH LIQUEFIED NATURAL GAS (LNG) AND SYNTHESIS OR FUEL GAS

[75] Inventors: Edward T. Child, Tarrytown; William L. Lafferty, Jr., Hopewell Junction; Robert M. Suggitt, Wappingers Falls; Frederick C. Jahnke, Rye, all of N.Y.

[73] Assignee: Texaco Inc., White Plains, N.Y.

[21] Appl. No.: 904,635

[22] Filed: Jun. 26, 1992

[51] Int. Cl.$^5$ .......................... F02C 1/00; F02G 3/00
[52] U.S. Cl. .................. 60/39.02; 60/39.12; 60/39.465; 60/728; 48/127.3; 48/197 R
[58] Field of Search ........... 60/39.02, 39.12, 39.463, 60/39.465, 728; 48/127.3, 180.1, 197 R

[56] References Cited

U.S. PATENT DOCUMENTS

| | | | |
|---|---|---|---|
| 3,631,673 | 1/1972 | Charrier et al. | 60/39.02 |
| 3,720,057 | 3/1973 | Arenson | 60/39.465 |
| 3,726,101 | 4/1973 | Arenson | 60/39.465 |
| 3,771,260 | 11/1973 | Arenson | 48/180.1 |
| 3,788,825 | 1/1974 | Arenson | 48/180.1 |
| 3,978,663 | 9/1976 | Mandrin | 60/728 |
| 4,036,028 | 7/1977 | Mandrin | 60/39.02 |
| 4,329,842 | 5/1982 | Hoskinson | 60/39.465 |

FOREIGN PATENT DOCUMENTS

0033393  2/1984  Japan .................. 48/180.1

Primary Examiner—Richard A. Bertsch
Assistant Examiner—Howard R. Richman
Attorney, Agent, or Firm—James J. O'Loughlin; Albert Brent

[57] ABSTRACT

Mechanical and electrical power are produced along with synthesis or fuel gas by the partial oxidation process with integrated combustion and steam turbines. By-product vaporized liquefied natural gas for feed to a pipeline for gas consumers is obtained by heat exchange with heat containing streams from the partial oxidation gasification and gas cleaning and purification zone; and optionally from heat containing streams from combustion and/or steam turbine zones which are integrated with said partial oxidation process. Heat from the combustion turbine exhaust gas is used as follows: (1) superheat steam for use in a steam turbine; (2) preheat water saturated clean sulfur-free synthesis or fuel gas with or without supplemental methane enrichment; (3) preheat oxygen gas for said partial oxidation zone; and (4) vaporize LNG. Pre, inter, and after stages of an air compressor are cooled by indirect heat exchange with LNG which is thereby warmed or vaporized.

18 Claims, 1 Drawing Sheet

COMBINED POWER CYCLE WITH LIQUEFIED NATURAL GAS (LNG) AND SYNTHESIS OR FUEL GAS

BACKGROUND OF THE INVENTION

Field of the Invention

This invention relates to a process for the production of power while using liquefied natural gas (LNG) and synthesis or fuel gas.

Liquefied natural gas (LNG) is generally brought in by tanker from remote sites and traditionally regasified by heat exchange with sea water. It is normally at atmospheric pressure at a temperature of about $-240°$ F. to $-270°$ F. and must be regasified before it can be used as a fuel. A single multi-component motive fluid was used as the liquefied natural gas exchange media in U.S. Pat. No. 3,479,832.

Raw synthesis gas, substantially comprising mixtures of $H_2$, $CO$, $CO_2$, $N_2$, $H_2O$, $H_2S$ and $COS$, as produced from sulfur-containing fossil fuels by contemporary partial oxidation processes, may have a methane content in the range of about nil to 2 mole percent and a maximum net heating value of about 300 BTU per standard cubic foot (SCF). In some applications, it is desirable to increase the methane content of the synthesis gas, for example to increase its gross heating value for use as fuel gas. In coassigned U.S. Pat. No. 3,688,438, synthesis gas was made having up to 26 volume percent of methane by the partial oxidation of a hydrocarbonaceous fuel using comparatively high steam to fuel weight ratios and no subsequent catalytic methanation step. Costly removal of water from the product gas was necessary. In coassigned U.S. Pat. No. 3,709,669, the synthesis gas leaving the partial oxidation gas generator is subjected to an additional step involving the catalytic water gas shift reaction to adjust the $H_2/CO$ mole ratio to preferably 3 before catalytic methanation. In comparison with the prior art, by the subject invention a dry, sulfur-free, $CH_4$-enriched synthesis or fuel gas is produced without costly catalytic methanation or drying steps.

SUMMARY

This is a process for the generation of power comprising:

(1) vaporizing liquefied natural gas (LNG) or warming liquefied or vaporized LNG by direct and/or indirect heat exchange with: (a) heat-containing streams from a partial oxidation gasification and gas cleaning and purification zone for the production of an effluent gas stream comprising synthesis or fuel gas; and/or (b) heat containing streams from combustion and/or steam turbine zones that are integrated with the zone in (a);

(2) burning said effluent gas stream from (1) with or without admixture with vaporized LNG in the combustor of a gas turbine along with air and optionally nitrogen to produce exhaust gas; and (3) expanding said exhaust gas in an expansion turbine for the production of mechanical power and/or electricity.

The heat-containing streams in (1) have a temperature in an overall range of about $40°$ F. to $1200°$ F., such as about ambient to $600°$ F., say less than about $400°$ F. These streams are selected from the group consisting of (a) hot quench water and/or the flashed gases and steam from depressurized quench water having a temperature in the range of about $150°$ F. to $600°$ F. and wherein said quench water is used to cool said effluent gas stream from (1)(a); (b) steam produced by indirect heat exchange between boiler feed water and the effluent gas stream from (1), (c) steam condensate from said integrated steam turbine, (d) scrubbing water used to clean said effluent gas stream from (1), (e) exhaust gas from said integrated combustion turbine after high quality heat is removed, (f) condensate produced by indirect heat exchange between rich acid-gas solvent absorbent from said gas purification zone in (1) and steam, (g) free-oxygen containing gas, and (h) combinations thereof.

BRIEF DESCRIPTION OF THE DRAWING

The sole FIGURE in this application is a schematic view of the claimed invention.

DESCRIPTION OF THE INVENTION AND THE DRAWING

The present invention involves an improved continuous process for the production of power while using liquefied natural gas (LNG) or $CH_4$-enriched sulfur-free synthesis gas as fuel. The gaseous fuel is burned in a combustor, which discharges exhaust gas. The exhaust gas is passed through an expansion turbine, thereby producing mechanical and/or electrical power and hot exhaust gas. The thermal efficiency of the process is greatly increased by extracting the heat from the exhaust gas by heating various streams in the process and optionally vaporizing LNG.

In the subject process, liquefied natural gas (LNG) may be vaporized or liquefied or vaporized LNG may be warmed. The vaporized LNG is introduced into a pipeline for distribution to residential and industrial users. It is also mixed with synthesis gas to produce methane-enriched synthesis gas for use as fuel gas in the integrated combustion turbine.

The partial oxidation process with or without integrated combustion and/or steam turbines is a well known process. For additional information, reference is made to coassigned U.S. Pat. Nos. 3,709,669; 3,868,817; 3,998,609; and 4,052,176 which are incorporated herein by reference. Depending on their chemical compositions, gaseous mixtures made by the partial oxidation process are referred to as synthesis gas, reducing gas, or fuel gas. They all substantially comprise $H_2$, $CO$, $CO_2$, $H_2O$ and $N_2$. Before cleaning and purification they may contain a small amount of particulate matter and sulfur containing gases. Synthesis gas substantially comprises $H_2$ and $CO$ in various ratios. Reducing gas is rich in $H_2$ and fuel gas contains greater amounts of $CH_4$. Heat-containing streams are defined herein as a gaseous or liquid stream as produced in the process for the partial oxidation of gaseous or liquid hydrocarbonaceous fuels or solid carbonaceous fuels including pumpable slurries of solid carbonaceous fuels for the production of synthesis gas, reducing gas, or fuel gas e.g. gaseous mixtures comprising $H_2+CO$. Included also are the heat containing streams from steps associated with the partial oxidation process including gas cooling, cleaning, and purifying; as well as the air stream for preparing oxygen for use in the partial oxidation gasifier. Advantageously, low level energy normally rejected from the partial oxidation process may now be used to assist in warming or vaporizing the LNG thus improving the thermal efficiency of that step. Further, the expensive and energy consuming sea water pump normally used to provide sea water as a source of energy to vaporize LNG may now be eliminated. Further, it also includes gaseous and liquid streams which are produced when a combustion and/or steam turbine for generating mechanical and/or electrical power is integrated with the partial oxidation process. The temperature of these streams are in the overall range of about 40° F. to 1200° F., such as a temperature in the range of about ambient to 600° F., say a temperature of less than about 400° F. The heat containing streams are selected from the group consisting of:

a. hot quench water and/or the flashed gases and steam from depressurized quench water having a temperature in the range of about 150° F. to 600° F.; wherein said quench water is produced by quenching the hot effluent gas stream from the partial oxidation reaction zone in a pool of water;

b. steam having a temperature in the range of about 600° F. to 1200° F. as produced in a waste heat boiler by indirect heat exchange between boiler feed water and the hot effluent gas stream from the partial oxidation reaction zone;

c. steam condensate at a temperature in the range of about 35° to 90° F. as produced by passing steam such as produced in (b) through a steam turbine as the working fluid;

d. scrubbing water at a temperature in the range of about 300° F. to 500° F., as produced by scrubbing the partially cooled stream of synthesis gas from (b);

e. exhaust gas from a combustion turbine at a temperature in the range of about 200° F. to 300° after high quality heat is removed;

f. condensate at a temperature in the range of about 50° F. to 150° F., as produced by indirect heat exchange between rich acid-gas solvent absorbent and steam.

g. free oxygen containing gas at a temperature in the range of about 40° F. to 400° F.

Figure 1:
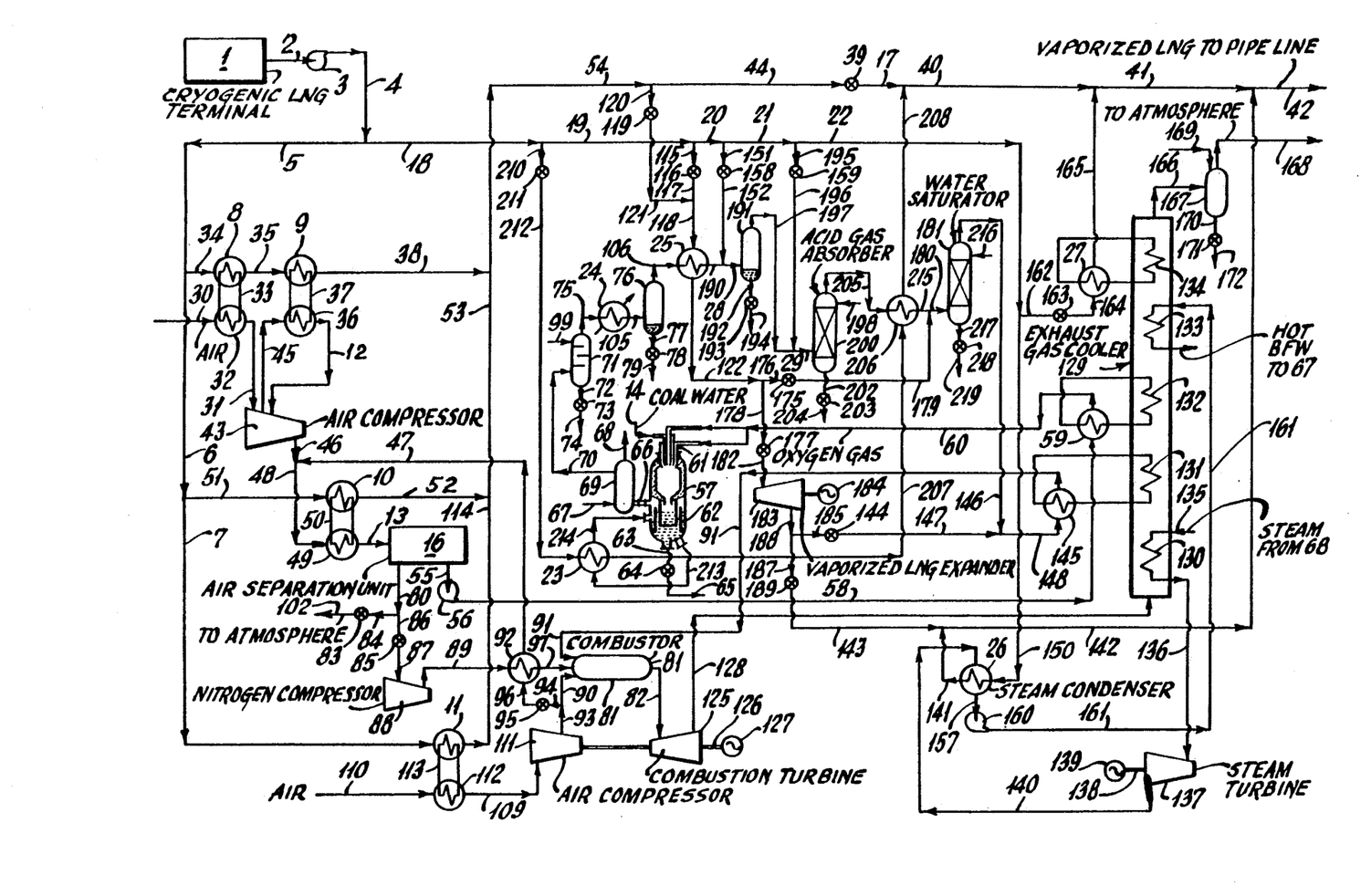

A more complete understanding of the invention may be had by reference to the accompanying schematic drawing which shows several embodiments of the process in detail.

Liquefied natural gas (LNG) from cryogenic storage 1 at a pressure in the range of about 0.7 to 1.2 atmospheres and a temperature in the range of about −270° F. to −240° F. is pumped through line 2 by pump 3 to line 4. The pressure of the LNG in line 4 is thereby increased to a pressure in the range of about 40 to 200 atmospheres by pump 3. It is more economic to elevate the pressure of LNG by pumping it as a liquid in comparison with compressing it as a gas. The LNG in line 4 is split into two portions: (a) the LNG in manifold lines 5-7 to be used as an indirect coolant for heat exchangers 8 to 11, and (b) the LNG in manifold lines 18 to 22 to be used as an indirect coolant for various heat exchangers in the partial oxidation gasification plant e.g. 23 to 25, as an indirect coolant for steam condenser 26, to be vaporized in heat exchanger 27, and as a direct coolant in Lines 28 and 29.

Thus, a portion of the LNG from lines 4, 5, and 34 is used to pre-cool air in line 30 which is obtained from the surroundings at a temperature in the range of about ambient °F. to 130° F. Advantageously, the use of cold liquefied LNG to cool the air entering air separation unit (ASU) 16 will improve the thermal efficiency and reduce the capital and operating costs of the ASU. Cooling the air prior to and/or between compression stages will improve compressor efficiency while cooling after compression will improve thermal efficiency of the ASU. The air is passed through heat exchanger 32 which is thermally coupled to heat exchanger 8 by a loop containing inert coolant e.g. nitrogen, in coil 33. This is a safety measure to prevent LNG from contacting air should there be a leak in the lines. The LNG in liquid phase is passed through lines 4, 5, 34, and heat exchanger 8 where it may be warmed to a temperature up to about −116.5° F. and passed through heat exchanger 8 as a liquid. Alternatively, it may be vaporized to a temperature in the range of about 32° F. to 60° F. Vaporized or liquid LNG leaves exchanger 8 through line 35 and is passed through interstage air cooler 9 which is thermally coupled to heat exchanger 36 by a loop containing inert coolant e.g. nitrogen in coil 37. Liquid LNG passes through heat exchanger 9 where it may be warmed to a temperature up to about −116.5° F., or alternatively vaporized LNG is heated in heat exchanger 9 to a temperature in the range of about 32° F. to 100° F. The physical state of the LNG after heat exchange depends upon such factors as initial temperature and pressure of the LNG, temperature of heat exchange fluid, and design of heat exchanger. The vaporized LNG passes through manifold pipe 38, lines 54, 44, valve 39, and pipes 17, 40 to 42 to a pipeline for distribution to gaseous LNG consumers. The temperature of the vaporized LNG in pipe 42 is in the range of about 32° F. to 60° F. and the pressure is in the range of about 20 to 200 atmospheres. The inert gas e.g. nitrogen in heat exchange loop 37 between heat exchangers 9 and 36 minimizes the possibility of having any LNG in exchanger 9 leaking into the air in exchanger 36. The air in line 31 is compressed in a number of stages in air compressor 43 with a cooling step included between each stage to improve compressor efficiency. Cooling of one typical interstage is effected by heat exchangers 9 and 36 with coolant loop 37. Hot partially compressed air is removed from compressor 43 through line 45, cooled in heat exchanger 36 by heat exchange with nitrogen in loop 37 and returned to compressor 43 for additional compression by way of line 12. The warm $N_2$ in loop 37 is cooled in heat exchanger 9 by indirect heat exchange with LNG from line 35. While only one interstage cooler is shown and described, it is understood that similar interstage coolers may be used for cooling the compressed air passing between the plurality of stages in a multi-stage air compressor. The compressed air leaving compressor 43 through line 46 at a pressure in the range of about 70 to 300 psia and a temperature in the range of about 70° F. to 200° F. is optionally mixed with a portion of the air from line 47. The temperature and pressure of the air in lines 46 and 47 are substantially the same. The air mixture in line 48 comprises about 0 to 75 volume % of air from line 47. The remainder is air from line 46. The air in line 48 is further cooled in heat exchanger 49 with an inert coolant gas, such as nitrogen, passing through refrigeration loop coil 50 which in turn is cooled in heat exchanger 10 by LNG from line 51. The inert coolant gas is used as a safety device for the same reason as previously mentioned. The LNG in heat exchanger 10 is vaporized and leaves through lines 52, 53 and passes through vaporized LNG manifold pipe 54, valve 39 and pipes 40 to 42 to a pipeline for distribution to vaporized LNG consumers. The compressed and pre-cooled air in line 13 at a temperature in the range of about 35° F. to 60° F. enters conventional air separation unit 16 where oxygen is separated from the nitrogen by distillation employing the Joule- Thompson Effect to derive additional intercooling. For additional description of air separation units, see Kirk-Othmer Encyclopedia of Chemical Technology, Third Edition, Pages 227 to 233, which is incorporated herein by reference.

The liquid oxygen leaving air separation unit 16 through line 55 at a temperature in the range of about −290° F. to −270° F. is passed through pump 56 to raise its pressure 10 to 15 atmospheres above that of partial oxidation gas generator 57. However, before entering the gasifier the liquid oxygen in line 58 is heated to a temperature in the range of about 40° F. to 700° F. in heat exchanger 59 and vaporized. At a pressure in the range of about 5 to 100 psia, above the gasifier inlet pressure the oxygen gas is passed through line 60 and burner 61 located in the top of gasifier 57 and extending downward into the upper inlet along the central axis of gasifier 57.

Partial oxidation gas generator 57 is a free-flow unobstructed down-flowing vertical refractory lined steel wall pressure vessel where the partial oxidation reaction takes place. A typical gas generator is shown and described in coassigned U.S. Pat. No. 3,998,609, which is incorporated herein by reference. Another scheme providing cooling the hot raw effluent gas stream in a radiant cooler followed by a waste heat boiler is shown in the drawing for coassigned U.S. Pat. No. 4,863,489, which is incorporated herein by reference.

A three or four stream annular type burner, such as shown and described in coassigned U.S. Pat. Nos. 3,847,564, and 4,525,175, which are incorporated herein by reference, may be used to introduce the feedstreams into the partial oxidation gas generator. With respect to U.S. Pat. No. 3,847,564, substantially pure oxygen gas is simultaneously passed through the central conduit 18 and outer annular passage 14 of said burner. The substantially pure oxygen comprises greater than 95 mole % $O_2$. It is used for improved combustion efficiency and to prevent nitrogen from air from diluting the product gas. The oxygen gas is supplied through line 60 at a temperature in the range of about 100° F. to 1000° F. The fuel feed comprising for example an aqueous slurry of solid carbonaceous fuel e.g. coal and/or petroleum coke, or alternatively a pumpable liquid hydrocarbon or liquid hydrocarbonaceous fuel with $H_2O$ is passed through the intermediate annular passage 16 at a temperature in the range of about ambient to 650° F.

A wide range of combustible carbon containing organic materials may be reacted in the partial oxidation gas generator with a free-oxygen containing gas optionally in the presence of a temperature moderating gas to produce a raw stream of synthesis or fuel gas.

The term hydrocarbonaceous as used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous." For example, there are (1) pumpable slurries of solid carbonaceous fuels, such as coal, lignite, particulate carbon, petroleum coke, concentrated sewage sludge, and mixtures thereof in water or a liquid hydrocarbon; (2) gas-solid suspension such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of 0 to 10 weight percent and an ash content in the range of about 0 to 50 weight percent.

The term liquid hydrocarbon or liquid hydrocarbonaceous fuel as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tarsand oil and shale oil, coal derived oil, aromatic hydrocarbon (such as benzene, toluene, xylene fractions), coal tar, cycle gas oil from fluid-catalytic-cracking operation, furfural extract of coker gas oil, tire oil and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed, in the case of liquid and gaseous feedstocks, may be at room temperature or it may be preferably preheated to a temperature up to as high as about 600° F. to 1200° F., say 800° F. but preferably below its cracking temperature. The hydrocarbonaceous feed may be introduced into the burner in liquid phase or in a vaporized mixture with a temperature moderator. Suitable temperature moderators include steam, water, $CO_2$-rich gas, nitrogen in air, by product nitrogen from a conventional air separation unit, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner. It may be at a temperature in the range of about ambient to 1200° F., say 300° F. to 600° F. The preferred temperature moderator is $H_2O$.

The burner assembly 61 is inserted downward through a top coaxial inlet port in the noncatalytic synthesis gas generator 57. The burner extends along the central longitudinal axis of the gas generator with the downstream end discharging a multiphase mixture of fuel, oxygen gas, and temperature moderator e.g. $H_2O$ directly into the reaction zone.

The relative proportions of solid, liquid, or gaseous fuels, water and oxygen in the feedstreams to the gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. Preferably the temperature in the gasifier is in the range of about 2200° F. to 2800° F., so that molten slag is produced. The pressure in the partial oxidation reaction zone is in the range of about 1 to 250 atmospheres. The weight ratio of $H_2O$ to carbon in the feed is in the range of about 0.2 to 3.0, such as about 1.0 to 1.2. The dwell time in the reaction zone is in the range of about 1 to 10 seconds, and preferably in the range of about 2 to 8 seconds. With the substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed as the oxidant in the synthesis or fuel gas partial oxidation gas generator, the composition of the effluent gas in mole % dry basis may be as follows: $H_2$ 2 to 20, CO 5 to 35, $CO_2$ 5 to 25, $CH_4$ 0 to 2, $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. For example, synthesis gas is rich in $H_2$ and CO, reducing gas is rich in $H_2$, and fuel gas is rich in $H_2$, CO, and $CH_4$. Coal has a high ash content e.g. about 10 to 30 wt. %. The slag will flow from the reaction zone of the gas generator as substantially inert molten slag and be quenched in quench water 62 at the bottom of gasifier 57. Periodically, the slag will be removed by way of a slag hopper (not shown) and line 63, valve 64, and line 65.

The hot gaseous effluent stream from the reaction zone of the synthesis gas generator may be quickly cooled below the reaction temperature to a temperature in the range of about 250° F. to 700° F. by direct quenching in water 62. Also, hot syngas in transfer line 66 may be cooled by indirect heat exchange for example with water from line 67 to produce steam in line 68 in gas cooler 69. The cooled gas stream in line 70 is scrubbed with water in scrubber 71. Water enters scrubber 71 through line 99 and water and particulate matter leave from the bottom through line 72, valve 73, and line 74. The water saturated gas at a temperature in the range of about 250° F. to 700° F. is passed through line 75 into heat exchanger 24 where its temperature is reduced to a temperature in the range of about 60° F. to 130° F. and below the dew point by heat exchange with a coolant. The coolant may be LNG or water. The cooled gas enters knockout pot 76 by way of line 105. Condensed water is removed from pot 76 through line 77, valve 78, and line 79.

The synthesis or fuel gas leaving water knockout pot 76 enters heat exchanger 25 by way of line 106 at a temperature in the range of about 60° F. to 130° F. There it is cooled by indirect heat exchange with liquid LNG from line 118. The LNG is vaporized and leaves exchanger 25 by way of line 122 at a temperature in the range of about −100° F. to 50° F. The synthesis or fuel gas leaving heat exchanger 25 at a temperature in the range of about 40° F. to 100° F. is passed through lines 190 and 28 into water knockout pot 191. Optionally, the temperature of the gas stream in line 190 may be further reduced to a temperature in the range of about 35° F. to 50° F. and the methane content of the gas stream increased by introducing liquid LNG from line 20 through line 151, valve 158, line 152 and mixed in line 28 with the synthesis or fuel gas from line 190. Water collects in the bottom of knockout pot 191 and is periodically drained through line 192, valve 193 and line 194. Optionally, when additional cooling of the synthesis or fuel gas stream is required, for example for improved operation of acid-gas absorber 200, LNG in liquid phase is passed through lines 21 and 195, valve 159, line 196 and mixed in line 29 with the stream of synthesis or fuel gas from line 197. The $CH_4$-enriched stream of synthesis or fuel gas in line 29 at a temperature in the range of about −75° F. to 60° F. is introduced into acid gas absorber 200. Cold lean, liquid acid-gas absorbent solvent such as monoethanolamine (MEA), diethanolamine (DEA), triethanolamine (TEA), diisopropanolamine, or methanol is introduced through line 198 near the top of absorption column 200. As the raw syngas passes up column 200 it makes contact with the liquid absorbent solvent passing down the column. Depending on the type of liquid solvent, substantially all of the $H_2S$, residual moisture, and COS in the synthesis gas is absorbed by the solvent. In such case, most of the $CO_2$ remains in the synthesis or fuel gas stream that is burned in combustor 81. The $SO_x$ content in the exhaust gases in line 82 is thereby substantially reduced. Rich absorbent solvent is removed through line 202, valve 203, and line 204 and sent to a solvent regeneration unit. The regenerated lean absorbent solvent is then introduced into acid gas absorber 200 by way of line 198. In one embodiment (not shown) prior to entering the solvent regeneration unit, the rich absorbent solvent is heated to a temperature high enough to drive off the acid-gases e.g. $H_2S$, COS and $CO_2$ by indirect heat exchange with steam. The steam condensate at a temperature in the range of about 212° F. to 340° F. may be used herein as a heat containing stream for vaporizing the LNG. A more detailed discussion of the use of LNG in conjunction with the acid gas absorption process may be found in copending coassigned U.S. patent application Ser. No. 07/900,388, which is incorporated herein by reference.

The clean sulfur-free synthesis or fuel gas in line 205 at a temperature in the range of about 60° F. to 100° F. is passed through heat exchanger 206 in indirect heat exchange with vaporized LNG from line 207 at a temperature in the range of about 120° F. to 230° F. The term sulfur-free as used herein means the removal of at least 95 mole % of the sulfur-containing gases originally present in the synthesis or fuel gas. The vaporized LNG leaves heat exchanger 206 through line 208 at a temperature in the range of about 135° F. to 250° F. and mixes in line 40 with the vaporized LNG from line 17. From there, the mixture of vaporized LNG passes through lines 41 and 42 to the pipeline which services consumers.

In one embodiment, the hot quench water 62 from the bottom of partial oxidation gas generator 57 is used as a heat containing stream to vaporize liquid LNG. Thus, LNG in liquid phase in line 18 is passed through line 210, valve 211, and line 212 and into heat exchanger 23 where it passes in indirect heat exchange with hot quench water 62 from the bottom of partial oxidation gas generator 57. The quench water leaves through line 213 at a temperature in the range of about 250° F. to 700° F., is cooled in heat exchanger 23, and returns to the bottom of gasifier 57 by way of line 214 at a temperature in the range of about 80° F. to 200° F. The liquid LNG is vaporized in heat exchanger 23 and at a temperature in the range of about 100° F. to 300° F. passes through line 207 to heat exchanger 206 where it preheats the sulfur free synthesis or fuel gas from line 205 to a temperature in the range of about 120° F. to 230° F.

The vaporized LNG in line 208 at a temperature in the range of about 135° F. to 250° F. mixes in line 40 with the stream of vaporized LNG from line 17.

The cooled sulfur free stream of synthesis or fuel gas leaves heat exchanger 206 through line 215 at a temperature in the range of about 120° F. to 230° F. Optionally its temperature may be increased further by mixing it in line 180 with additional vaporized LNG from line 179, the temperature increase being dependent on the amount of vaporized LNG being added. The sulfur-free $CH_4$-enriched stream of synthesis or fuel gas in line 180 enters conventional water saturator 181. Water enters saturator 181 through line 216 and leaves through line 217, valve 218, and line 219. At least a portion of from one or more of the water streams selected lines 79, 194, and 172 may be used in preparation of the aqueous coal slurry feed which is introduced into partial oxidation gas generator 57 by way of line 14.

The by-product nitrogen gas leaving air separation unit 16 at a temperature in the range of about $-100°$ F. to 60° F. by way of line 80 may be introduced into combuster 81 in order to reduce the reaction temperature and thereby reduce the amount of $NO_x$ in the exhaust gas leaving through line 82. The nitrogen gas would also replace at least a portion of the steam used to suppress the $NO_x$ thus further increasing the overall thermal efficiency. In such case valve 83 in discharge line 84 and 102 to the atmosphere is closed and valve 85 in line 86 is opened. The nitrogen gas in line 87 is compressed in compressor 88 to a pressure in the range of about 200 to 600 psia in line 89. Interstage cooling of nitrogen compressor 88 may be effected by heat exchange between LNG from line 7 and partially compressed hot nitrogen from an upstream stage in nitrogen compressor 88. The compressed nitrogen in line 89 at a temperature in the range of about 100° F. to 600° F., may be heated to a temperature of at least 400° F. and preferably up to 900° F. to improve the thermal efficiency of the combustion turbine since the air in line 90 and the clean synthesis gas enriched with LNG in line 91 will also be entering the combustor at temperatures in the same range. Thus, optionally the nitrogen gas in line 89 may be heated to said temperature by indirect heat exchange in exchanger 92 with hot compressed air from lines 93, 94, valve 95 and line 96. Although not shown, a slipstream from the compressed nitrogen in line 89 could be used to provide cooling of the turbine stages in combustion turbine 125. Each of the three feedstreams are introduced into combustor 81 at a pressure in the range of about 250 to 400 psia.

Air at ambient conditions in line 110 is cooled and compressed in axial air compressor 111 to provide the oxidant for the complete combustion reaction in combustor 81. The air in line 110 is pre-cooled in double exchanger 11 and 112 to a temperature in the range of about 35° F. to 50° F. Inert gas medium shown in loop coil 113 minimizes the possibility of any LNG from exchanger section 11 mixing with the air being fed into compressor 111. The LNG coolant is obtained from line 7. Line 7 is also connected to LNG manifold lines 6, 5, 4 and 2. Double exchanger system and 112 is different from the others mentioned as it only represents inlet cooling of the air in line 110 since the heavy duty commercially available axial air compressor 111 does not have interstage cooling. However, by cooling the inlet air to for example 35° F., approximately 5 volume percent more air will pass through the compressor than if the ambient temperature is 60° F. Further, approximately 10 volume percent more air will pass through the compressor than if the ambient temperature is 90° F. This additional volume of air may be withdrawn from the compressor at an intermediate point, for example through line 93 and control valve 95 to provide additional air for the air separation unit 16 and to permit a comparable size reduction of air separation unit compressor 43. The pressure of the air leaving compressor 111 is about 40 to 150 psia higher than the air pressure from compressor 43 in line 46. This will always maintain a positive flow after the air in line 47 is cooled in exchanger 92. Cooling the air in heat exchanger 112 to a temperature in the range of about 35° F. to 50° F. in line 109 has the advantage of exchanging its heat with some of the LNG from line 7, producing vaporized LNG in line 114, and increasing the efficiency of the air compressor 111. While vaporized LNG from all of these heat exchangers are shown in the drawing to discharge into a single pipe line, comprising lines 114, 53, 54, 44, valve 39 and lines 17, 40 to 42, any one or any combination of these heat exchangers for vaporizing LNG may be included in the subject invention. Similarly, the subject invention may include the other methods of vaporizing LNG described and shown in the drawing, taken singly or in combination with any one or more of the methods shown.

The exhaust gas in line 82 from combustor 81 is introduced into combustion turbine 125 as the working fluid. The power derived from rotating turbine shaft 126 is used to operate a mechanical device e.g. pump or compressor, and/or an electrical device e.g. electric generator 127. The expanded exhaust gas in line 128 at a temperature in the range of about 600° F. to 1400° F. is introduced into exhaust gas cooler 129 where it provides the heat source for a plurality e.g. 5 of separate heat exchanger coils 130 to 134.

Accordingly, high pressure steam leaving waste heat boiler 69 in line 68 at a temperature in the range of about 600° F. to 1000° F. is passed through line 135, and coil 130 in exhaust gas cooler 129 and superheated to a temperature in the range of about 800° F. to 1300° F. by indirect heat exchange with exhaust gas at a temperature in the range of about 1000° F. to 1200° F. The superheated steam in line 136 is the working fluid for steam turbine 137. Rotating axial shaft 138 drives electric generator 139. Exhaust steam leaving turbine 137 through line 140 at a temperature in the range of about 35° F. to 60° F. is cooled and condensed in steam condenser 26 by indirect heat exchange with LNG from line 22 and 150 which enters at a temperature in the range of about $-240°$ F. to $-270°$ F. and a pressure in the range of about 20 to 200 atmospheres. The condensation pressure and temperature of the low pressure steam exiting steam turbine 137 by way of line 140 is reduced to a vacuum pressure of about 0.2 to 0.5 inches of mercury and a corresponding temperature of about 35° F. to 59° F. The latter is about 10° F. lower than that which is attainable for designs employing sea water as the cooling medium for steam turbine condensers in northern Europe. For steam condensers employing water from cooling towers the vacuum pressure is set at about 1.5 inches of mercury and a temperature of about 92° F. The LNG used to condense the steam is vaporized and at a pressure in the range of about 20 to 200 atmospheres is passed through lines 141 and 142 to collection manifold 42 where it is combined with vaporized LNG from line 41. The vaporized LNG in line 142 is optionally mixed in line 141 with about 0 to 75 volume % of the vaporized LNG from line 143. Line 42 leads to a pipeline that services vaporized LNG consumers. The LNG gas is provided to consumers at a temperature in the range of about 32° F. to 100° F. and a pressure in the range of about 40 to 500 psia.

A heat exchange fluid e.g. $H_2O$ in loop coil 131 which thermally links exhaust gas cooler 129 with heat exchanger 145, picks up heat from the exhaust gas passing through exhaust gas cooler 129 in that area of the cooler at a temperature in the range of about 500° F. to 700° F. With valve 144 open, the hot heat exchange fluid in heat exchanger 145 heats up a mixture of water saturated synthesis or fuel gas from line 146 at a temperature in the range of about 400° F. to 650° F. and expanded vaporized LNG from lines 185 and 147. This gaseous mixture in line 148 has a temperature in the range of about 200° F. to 400° F. and a methane content in the range of about 10 to 80 mole %. The increased methane content in the $CH_4$-enriched synthesis gas in line 148 will reduce the $NO_x$ emissions in the exhaust gases in line 82. The power out of combustion turbine 125 will be increased. The heat rate will be lowered due to the $CO_2$ contained in the synthesis or fuel gas After passing through heat exchanger 145, the gaseous mixture in line 91 has a temperature in the range of about 400° F. to 650° F. and a pressure in the range of about 200 to 600 psia. It is burned in combustor 81 with air from line 90, optionally in the presence of nitrogen from line 97.

The amount of vaporized LNG in the mixture of fuel gas fed to combustor 81 by way of line 91 may be controlled by valves 144, 158, 159 and 175. For example, the fuel gas may comprise about 10 to 80 volume % of vaporized LNG, and the remainder comprising synthesis or fuel gas. Additions of LNG directly to the synthesis or fuel gas will raise the BTU content of the synthesis or fuel gas entering the combustion turbine. Synthesis or fuel gas produced by air gasification will ordinarily have a lower heat content than that produced with oxygen as the oxidant.

The heat exchange fluid e.g. water in loop coil 132 thermally links exhaust gas cooler 129 with heat exchanger 59. The heat exchange fluid picks up heat from the exhaust gas passing through exhaust gas cooler 129 in that area at a temperature in the range of about 300° F. to 500° F. Liquid oxygen enters heat exchanger 59 from line 58 at a temperature in the range up to about −191° F. and a pressure in the range of about 10 to 260 atmospheres. The liquid oxygen is heated to a temperature in the range of about 40° F. to 400° F. and a pressure in the range of about 10 to 260 atmospheres and is vaporized. The vaporized oxygen in line 60 is passed through burner 61 and into the reaction zone of partial oxidation gas generator 57. Oxygen is the preferred oxidant for the partial oxidation reaction since higher thermal efficiencies are achieved. However, in other embodiments other free-oxygen containing gases may replace substantially pure oxygen which comprises more than 95 mole % oxygen in the partial oxidation reaction. For example, air and oxygen-enriched air comprising greater than 21 mole % oxygen may be used. The use of air gasification is attractive since it would eliminate the air separation plant.

The condensate from steam condenser 26 in line 157 is at a temperature in the range of about 35° F. to 60° F. It is pumped by pump 160 through line 161 and into heat exchange coil 133 in exhaust gas cooler 129 where it is heated to a temperature in the range of about 150° F. to 300° F. The hot water leaves coil 133 and is introduced into waste heat boiler 69 by way of line 67 as boiler feed water.

In one embodiment, cryogenic liquid LNG is vaporized by heat exchange with the exhaust gas just prior to leaving exhaust gas cooler 129. In such case LNG in liquid phase in line 22 is passed through line 162, valve 163, and line 164 into heat exchanger 27. Heat exchanger 27 is thermally coupled to exhaust gas cooler 129 by the heat exchange fluid e.g. liquid nitrogen, (or any other inert refrigerant, including brine) or $H_2O$ flowing in loop coil 134. The heat exchange fluid in coil 134 picks up heat from the exhaust gas about to leave from the top of exhaust gas cooler 129 at a temperature in the range of about 60° F. to 150° F. LNG leaves heat exchanger 27 through lines 165 and 41 and enters line 42 leading to a pipeline for distribution of vaporized LNG to consumers. Cooled exhaust gas leaving exhaust gas cooler in line 166 is saturated with water. This water is separated from the exhaust gas in knockout pot 167. The dried exhaust gas may be discharged to the atmosphere through line 168. A base agent e.g. carbonate and/or bicarbonate of a metal from the group Na, Ca, Mg and mixtures thereof is introduced into knockout pot 167 by way of line 169. Condensed water containing the sulfites and nitrates and nitrites of Na, Ca, Mg and mixtures thereof is withdrawn through line 170, valve 171, and line 172 and used in the preparation of the coal-water feed slurry for partial oxidation gasifier 57.

Condensation of the water in the gas turbine combustion exhaust gases exiting the exhaust gas cooler 129 has the effect of scrubbing out the small amount of $SO_x$ and $NO_x$ present in this stream. Addition of the base agent, i.e. $Na_2CO_3$, $CaCO_3$, $MgCO_3$ etc., to the condensate will remove most of the acid gases to levels that are barely detectable. Also, use of a carbonate instead of a hydroxide will not allow significant amounts of $CO_2$ to dissolve in the condensed water which may then be recycled for direct addition to the coal slurry to yield a zero water requirement for the entire process. In addition, the presence of the calcium, magnesium and/or sodium salts in the coal slurry would help to act as a fluxant for the slag formed during the gasification of the coal in gasifier 57. The presence of the oxygen in the nitrites, nitrates and sulfites, which originate from the $SO_x$ and $NO_x$ from the exhaust gas could have a positive effect on reducing the specific oxygen requirement in the partial oxidation reaction.

Since the amount of water in the combustion turbine 125 exhaust gases passing through the exhaust gas cooler 129 is two to five times the amount required for slurrying the coal, several water condensation zones could be set up on the exit end of the exhaust gas cooler 129. The first one 167, wherein the exit gas is cooled to its dew point, would have the carbonate additive present so that essentially all of the $SO_x$ and $NO_x$ is chemically absorbed in the condensate. Water from this source may be used for preparing the coal slurry to be charged to the gasifier. Additional moisture collected from further cooling of the combustion gases leaving exhaust gas cooler 129 would be condensed out in a second zone wherein no additives would be added. This water would be chemically pure and could be used for direct injection into clean syngas saturator 181 or used as boiler feedwater in line 67 with little or no additional treating to provide a plant with zero water requirement. In fact, depending on the moisture content of the coal feed, a plant could be designed to provide a net excess amount of potable water as a byproduct.

Synthesis or fuel gas is made herein by the partial oxidation of petroleum refinery streams, particularly heavy residuums such as vacuum residues or visbreaker bottoms, Orimulsion® and coal and/or petroleum coke slurries with water or liquid hydrocarbonaceous fuels. The resultant thermal reaction produces a biologically inert slag that drops to the bottom of a water quench chamber 62 for removal by way of line 63, valve 64, and line 65. The raw synthesis gas may be cooled to a temperature in the range of about 250° F. to 700° F. by quenching in water bath 62 followed by cooling to a temperature in the range of about 250° F. to 350° F. in waste heat boiler 69. Steam at a pressure of about 30 to 135 psia leaves through line 68. In another embodiment such as shown in coassigned U.S. Pat. No. 4,863,489, which is incorporated herein by reference, the hot raw effluent gas stream from the partial oxidation reaction zone is cooled first in a radiant cooler to a temperature in the range of about 1000° F. to 1500° F. followed by cooling in a convection cooler to a temperature in the range of about 400° F. to 1000° F. In one embodiment, not shown, the water saturated scrubbed synthesis or fuel gas in line 75 is introduced into a conventional catalytic water gas shift reactor to increase the $H_2/CO$ ratio and the amount of $CO_2$ in the gas stream. Any conventional water-gas shift catalyst may be used in the reaction between CO and $H_2O$ to produce $H_2$ and $CO_2$. Advantageously, the additional $CO_2$ will decrease the formation of $NO_x$ in the exhaust gas from combustor 81, provide more power from combustion turbine 125, and provide heat from the shift conversion reaction to superheat steam generated in waste heat boiler 69. The synthesis or fuel gas in line 75 enters cooler 24 with or without being water-gas shifted.

The cooled gas stream is passed through line 105 into knockout pot 76. In one embodiment, the scrubbed and partially dewatered synthesis or fuel gas in line 106 is passed into heat exchanger 25 where its temperature is reduced to a temperature in the range of about 40° F. to 100° F. by indirect heat exchange with LNG in the liquid or vapor phase. Thus, with valve 119 closed, liquid phase LNG from line 19 is passed through line 115, valve 116, and lines 117-118 and into the shell side of heat exchanger 25. Alternatively, with valve 116 closed and valve 119 in line 120 open, vaporized LNG from line 54 at a temperature in the range of about −240° F. to −270° F. may be passed through lines 121 and 118 into heat exchanger 25 as the coolant. LNG vapor at a temperature in the range of about 100° F. to 300° F. leaves heat exchanger 25 by way of line 122 at a pressure in the range of about 20 to 200 atmospheres.

The vaporized LNG in line 122 may now go in one or more directions by controlling valve 175 in line 176 and/or valve 177 in line 178. For example, the vaporized LNG in line 122 may pass through line 176, valve 175, line 179 and mix with synthesis or fuel gas in line 180 prior to passing into water saturator 181. The vaporized LNG in line 122 may also pass through line 178, valve 177, line 182 into LNG expander 183. The pressure of the vaporized LNG is reduced to a value in the range of about 100 to 800 psia by expander 183. The expander drives electric generator 184. By controlling valve 144 in line 185 and valve 189 in line 187 the expanded and vaporized LNG in line 188 may be passed through lines 188, 187, valve 189, lines 143, 142, and 42 to a pipeline for distribution to consumers. The expanded and Vaporized LNG in line 188 may also pass through line 185, valve 144, line 147 and mix in line 148 with the synthesis or fuel gas from line 146 prior to being preheated in heat exchanger 145 and fed into combustor 81 as previously described.

Direct cooling by introducing LNG directly into the synthesis or fuel gas has the advantage of not having to install a refrigeration unit while enriching the thermal content of the synthesis gas by the addition of methane. By direct injection of LNG much of the equipment associated with a refrigeration unit, such as the compressor, may be thereby avoided. However, in certain embodiments it may be desirable to use the LNG for indirect cooling of the synthesis gas in line 197. In such case the LNG would pass through a heat exchanger (not shown) located prior to acid gas absorber 200. In such case, the LNG being used as the coolant is vaporized and the vaporized LNG is passed to line 42 and the pipeline for distribution to external industrial and domestic consumers. Although the syngas stream in line 190 was dehydrated by cooling it down to −75° F. to +60° F. to improve the efficiency of the acid gas removal step in acid gas absorber 200. it is usually very desirable to saturate the synthesis or fuel gas, with hot water before it enters combustor 81 in the gas turbine. Saturating the fuel gas, or the air or nitrogen entering the combustor, gives the gaseous mixture more mass and heat capacity. This is useful for improving the efficiency of the turbine and reducing $NO_x$ emissions. At the same time, the excess low temperature heat in the system is effectively used by transferring it from the hot water to the fuel gas. Further, air compressor power consumption is reduced since the excess air demand from the compressor is reduced. The advantage of adding excess water or steam to the system instead of additional quantities of nitrogen, air, or any other non-combustible gas is to avoid the higher costs associated with compression. Synthesis or fuel gas stream 180 has a temperature in the range of about 100° F. to 300° F. It may be saturated in the clean syngas saturator 181 by coming in contact with hot water at a temperature of about 325° F. to 450° F. This gives the $CH_4$ enriched syngas additional mass and heat capacity when it is burned in combustor 81.

In one embodiment not shown, combustion turbine 125 and steam turbine 137 are on the same shaft and drive electric generator 127. In one embodiment not shown, steam turbine 137 comprises high pressure, intermediate pressure and low pressure stages all mounted on the same shaft to drive generator 139. The required steam is derived from various coils in the exhaust gas cooler 129. Other sources for the steam include the conventional radiant or waste heat boiler associated with the partial oxidation gas generator.

The process of the invention has been described generally and by examples with reference to hydrocarbonaceous feedstocks of particular compositions for purposes of clarity and illustration only. From the foregoing it will be apparent to those skilled in the art that various modifications of the process and the raw materials disclosed herein can be made without departure from the spirit of the invention.

We claim:

1. A process for the generation of power comprising:
   (1) cooling air in the pre, inter, and after coolers of an air compressor for an air separation unit by indirect heat exchange with liquefied natural gas (LNG), thereby warming said LNG;

(2) separating the cooled air from (1) in an air separation unit into a liquid stream of oxygen and a gaseous stream of nitrogen;

(3) heating and gasifying said oxygen stream by indirect heat exchange with a heat transfer fluid; wherein said heat transfer fluid is heated by indirect heat exchange with the exhaust gas from a gas turbine;

(4) reacting said gaseous stream of oxygen from (3) with a fuel feedstock selected from the group consisting of liquid hydrocarbonaceous fuel, solid carbonaceous fuel, gaseous hydrocarbon fuel, and mixtures thereof in the reaction zone of a partial oxidation gas generator with a temperature moderator to produce a hot effluent stream of fuel gas, and cooling, cleaning, purifying, and saturating with water said effluent stream of fuel gas; and (5) burning said effluent stream of fuel gas from (4) or said effluent stream of fuel gas in admixture with LNG from (1) with compressed air in the combustor of a gas turbine, and discharging the resulting exhaust gas through an expansion turbine for the production of mechanical power and/or electrical energy.

2. The process of claim 1 provided with the steps of compressing the gaseous stream of nitrogen from (2) in a multi-stage nitrogen compressor and heating the compressed nitrogen stream by indirect heat exchange with said compressed air from (5).

3. The process of claim 2 provided with the step of cooling the compressed nitrogen between stages by indirect heat exchange with LNG.

4. The process of claim 1 provided with the step of cooling said turbine in (5) with a portion of said nitrogen gas from (2).

5. The process of claim 1 provided with the steps of cooling the exhaust gas from said turbine in (5) to a temperature below the dew point by indirect heat exchange with a heat exchange fluid which in turn is cooled by indirect heat exchange with liquid LNG and thereby warming the LNG; condensing and separating out water from said cooled exhaust gas in a knockout pot; introducing a carbonate or bicarbonate of a metal from the group Na, K, Mg, and mixtures thereof into said water in said knockout pot and producing water soluble sulfites, nitrates and nitrites, and discharging purified exhaust gas.

6. The process of claim 5 provided with the steps of preparing an aqueous slurry of solid carbonaceous fuel with the water from said knockout pot; and introducing said aqueous slurry of solid carbonaceous fuel into a partial oxidation gas generator.

7. The process of claim 1 provided with the steps of cooling said hot effluent stream of fuel gas from the partial oxidation gas generator in (4) by direct and/or indirect contact with water; scrubbing the cooled fuel gas with water; cooling the resulting water saturated scrubbed fuel gas to a temperature in the range of about 60° F. to 130° F. and below the dew point by direct and/or indirect heat exchange with liquefied natural gas to condense the water in said stream of fuel gas, separating out said condensed water; preparing an aqueous slurry of solid carbonaceous fuel with said separated water; and introducing said aqueous slurry of solid carbonaceous fuel into said partial oxidation gas generator in (4) as the fuel feedstock.

8. The process of claim 1 provided with the step of introducing by-product nitrogen gas from an air separation unit into the combustor of the gas turbine in (3).

9. The process of claim 1 with the step of burning at least a portion of said warmed LNG from (1) in said combustor in (5) while in admixture with purified effluent gas from (4) saturated with water.

10. The process of claim 1 provided with the step of introducing the warmed LNG from (1) into a pipeline for distributing to gas consumers.

11. The process of claim 1 provided with the step of water-gas shifting the effluent fuel gas stream from (4) to increase its $H_2 + CO_2$ content prior to step (5).

12. The process of claim 1 provided with the step of vaporizing LNG by indirect heat exchange with scrubbed, cooled, and dewatered fuel gas from (4), and a the vaporized LNG in an expansion turbine for the production of electrical power.

13. The process of claim 1 provided with the step of passing the exhaust gas from (5) in indirect heat exchange with saturated steam thereby producing superheated steam.

14. The process of claim 1 provided with the steps of passing the exhaust gas leaving the turbine in (5) through an exhaust gas cooling means comprising a cylindrical shell through which said exhaust gas enters at one end at a temperature in the range of about 800° F. to 1600° F., passes in indirect heat exchange with a plurality of cooler streams and leaves at the other end of said exhaust gas cooling means at a temperature in the range of about 100° F. to 250° F.

15. The process of claim 14 wherein said cooler streams comprise a plurality of separate streams of heat exchange fluid with each separate stream passing through a portion of a separate looping coil located inside of said shell and spaced along its length, thereby heating said heat exchange fluid; and wherein a portion of each looping coil is located within a separate heat exchanger and provided with the steps of passing one stream of said heat exchange fluid in indirect heat exchange with a stream of fuel gas produced in said partial oxidation gas generator or a fuel gas enriched with methane passing through said separate heat exchanger and introducing the preheated stream of fuel gas into said combustor as the fuel; and passing a separate stream of preheated heat exchange fluid into a separate heat exchanger in indirect heat exchange with a stream of free-oxygen containing gas in admixture with supplemental $H_2O$ passing through said separate heat exchanger, and introducing said preheated stream of free-oxygen containing gas into said partial oxidation gas generator.

16. The process of claim 14 provided with the steps of superheating by indirect heat exchange between boiler feed water and said exhaust gas in said exhaust gas cooling means, expanding said superheated steam in a steam turbine which drives an electric generator for the production of electricity, cooling said expanded steam in a steam condenser by indirect heat exchange with liquefied natural gas (LNG) thereby vaporizing said LNG and producing steam condensate, introducing said vaporized LNG into a pipeline for distribution to consumers, preheating said condensate by heat exchange with said exhaust gas in said exhaust gas cooling means to produce warm water, and introducing said warm water into a synthesis or fuel gas saturator to saturate said synthesis or fuel gas stream prior to its introduction into said combustor in step (5).

17. The process of claim 16 provided with the step of driving an electric generator by locating said steam turbine and said expansion turbine on the same shaft.

18. The process of claim 16 provided with the step of driving said steam turbine with high pressure steam, intermediate pressure steam, and low pressure steam, wherein said steam is produced by indirect heat exchange between boiler feed water or steam and said exhaust gas in said exhaust gas cooling means.

* * * * *